(12) United States Patent
Chen et al.

(10) Patent No.: US 8,614,551 B2
(45) Date of Patent: Dec. 24, 2013

(54) SCR DIMMING CIRCUIT AND METHOD

(75) Inventors: Shenglun Chen, Hangzhou (CN); Wei Chen, Saratoga, CA (US); Xiaoru Xu, Hangzhou (CN)

(73) Assignee: Hangzhou Silergy Semiconductor Technology Ltd, Hangzhou (CN)

( * ) Notice: Subject to any disclaimer, the term of this patent is extended or adjusted under 35 U.S.C. 154(b) by 154 days.

(21) Appl. No.: 13/402,025

(22) Filed: Feb. 22, 2012

(65) Prior Publication Data
US 2012/0242237 A1  Sep. 27, 2012

(30) Foreign Application Priority Data

Mar. 23, 2011  (CN) .......................... 2011 1 0069796

(51) Int. Cl.
*H05B 37/02* (2006.01)

(52) U.S. Cl.
USPC .................. 315/200 R; 315/194; 315/291

(58) Field of Classification Search
None
See application file for complete search history.

(56) References Cited

U.S. PATENT DOCUMENTS

| | | | |
|---|---|---|---|
| 5,323,088 A * | 6/1994 | Cunningham | 315/195 |
| 5,585,713 A * | 12/1996 | Crane et al. | 323/323 |
| 5,920,156 A * | 7/1999 | Carson et al. | 315/317 |
| 6,218,787 B1 * | 4/2001 | Murcko et al. | 315/194 |
| 6,226,196 B1 * | 5/2001 | Toshinari et al. | 363/134 |
| 7,164,238 B2 * | 1/2007 | Kazanov et al. | 315/209 SC |
| 7,180,248 B2 * | 2/2007 | Kuennen et al. | 315/224 |
| 7,259,527 B2 * | 8/2007 | Foo | 315/291 |
| 7,265,498 B2 * | 9/2007 | Liu | 315/224 |
| 7,385,357 B2 * | 6/2008 | Kuennen et al. | 315/224 |
| 7,391,168 B1 * | 6/2008 | Dernovsek et al. | 315/291 |
| 7,688,006 B2 * | 3/2010 | Foo | 315/307 |
| 7,965,047 B2 * | 6/2011 | Wang | 315/219 |
| 8,193,713 B2 * | 6/2012 | Jung et al. | 315/158 |
| 2005/0093475 A1 * | 5/2005 | Kuennen et al. | 315/209 R |
| 2006/0261753 A1 * | 11/2006 | Foo | 315/291 |
| 2007/0085487 A1 * | 4/2007 | Kuennen et al. | 315/209 R |
| 2007/0120497 A1 * | 5/2007 | Liu | 315/209 R |
| 2008/0211417 A1 * | 9/2008 | Foo | 315/207 |
| 2009/0278466 A1 * | 11/2009 | Wang | 315/219 |
| 2010/0141158 A1 * | 6/2010 | Newman et al. | 315/182 |
| 2010/0207536 A1 * | 8/2010 | Burdalski et al. | 315/224 |

FOREIGN PATENT DOCUMENTS

CN  101605413 A  12/2009

* cited by examiner

*Primary Examiner* — Crystal L Hammond
(74) *Attorney, Agent, or Firm* — Michael C. Stephens, Jr.

(57) ABSTRACT

The present invention relates to a silicon-controlled rectifier (SCR) dimming circuit and method for regulating the luminance of a light-emitting diode (LED) load. In one embodiment, an SCR dimming circuit can include: an SCR rectifying circuit having an SCR element that receives an AC power supply, and generates a lack-phase AC voltage; a rectifier bridge that converts the lack-phase AC voltage to a lack-phase DC voltage, where the lack-phase DC voltage is filtered through a filter capacitor to generate a smooth DC voltage; a conduction phase angle signal generator that receives the lack-phase DC voltage and generates a controlling signal indicating a conduction phase angle range of the SCR element; and a dimming signal generator that compares the controlling signal and a slope reference signal to output a dimming signal to control the luminance of the LED load.

10 Claims, 7 Drawing Sheets

SCR DIMMING CIRCUIT AND METHOD

RELATED APPLICATIONS

This application claims the benefit of Chinese Patent Application No. CN201110069796.2, filed on Mar. 23, 2011, which is incorporated herein by reference in its entirety.

FIELD OF THE INVENTION

The present invention generally pertains to a dimming circuit for a lamp load, and more particularly to a silicon-controlled rectifier (SCR) dimming circuit for a light-emitting diode (LED) load.

BACKGROUND

In the field of lighting, and in view of the advantages of smaller size, more preferable price, and wider dimming range, silicon-controlled rectifier (SCR) dimming schemes are widely used. For example, applications include stage lighting, directional lighting, and surrounding illumination. By controlling a conduction phase angle of an SCR element, a part of the input sine wave of an AC power supply may be cut off to decrease average voltage value to control the supply to the lamp load, thus achieving dimming operation.

In cases when the external voltage supply is relatively low, a holding resistor may be added to generate a current to maintain conduction of the SCR element. However, drawbacks of this approach include increased power loss, lower operation efficiency, and poorer dimming performance.

SUMMARY

In one embodiment, an SCR dimming circuit can include: (i) an SCR rectifying circuit having an SCR element configured to receive an AC power supply, and to generate a lack-phase AC voltage; (ii) a rectifier bridge coupled to the SCR rectifying circuit, where the rectifier bridge is configured to convert the lack-phase AC voltage to a lack-phase DC voltage, where the lack-phase DC voltage is configured to be filtered through a filter capacitor to generate a smooth DC voltage; (iii) a conduction phase angle signal generator coupled to the rectifier bridge, where the conduction phase angle signal generator is configured to receive the lack-phase DC voltage, and to generate a controlling signal that indicates a conduction phase angle range of the SCR element; and (iv) a dimming signal generator coupled to the conduction phase angle signal generator and being configured to compare the controlling signal and a slope reference signal to output a dimming signal, the dimming signal generator having a dimming phase angle range from a predetermined start-up phase angle to a cut-off phase angle, where the cut-off phase angle is determined by the filter capacitor and the AC power supply. The slope reference signal is configured to indicate an average value at each phase angle of the AC power supply in a half cycle having a first reference corresponding to the start-up phase angle and a second reference corresponding to the cut-off phase angle. When the controlling signal is equal to the first reference, a light-emitting diode (LED) load is configured to be controlled by the dimming signal to operate in a maximum luminance. When the controlling signal is equal to the second reference, the LED load is configured to be controlled by the dimming signal to operate in a minimum luminance. Also, when the controlling signal is between the first reference and the second reference, the LED load is configured to be controlled by the dimming signal to change linearly between the maximum luminance and the minimum luminance.

In one embodiment, an LED driver can include: (i) the SCR dimming circuit; and (ii) a power stage and a driving circuit, where the power stage and the driving circuit are configured to receive the DC voltage generated by the filter capacitor and the dimming signal to drive and to regulate luminance of the LED load.

In one embodiment, an SCR dimming method for regulating luminance of an LED load, can include: (i) converting an external AC power supply to a lack-phase AC voltage; (ii) rectifying the lack-phase AC voltage to generate a lack-phase DC voltage; (iii) converting the lack-phase DC voltage to a controlling signal that indicates a conduction phase angle range of an SCR element; (iv) comparing the controlling signal and a slope reference signal to generate a dimming signal; (v) controlling, by the dimming signal, the LED load to operate in a maximum luminance when the controlling signal is equal to a first reference of the slope reference signal; (vi) controlling, by the dimming signal, the LED load to operate in a minimum luminance when the controlling signal is equal to a second reference of the slope reference signal; and (vii) controlling, by the dimming signal, the LED load to change linearly when the controlling signal is between the first reference and the second reference of the slope reference signal.

Embodiments of the present invention can advantageously provide several advantages over conventional approaches. Particular embodiments may provide an improved SCR dimming circuit and method that results in increased efficiency and improved dimming performance without flicker. For example, due to use of a filter capacitor, current may only be generated from a start-up phase angle to about a 90° phase angle, as may be determined by a filter capacitor and a value of an AC voltage supply. Therefore, a holding resistor can be avoided when the dimming operation is employed within the phase angle range. Other advantages of the present invention will become readily apparent from the detailed description of preferred embodiments below.

DETAILED DESCRIPTION

Figure 1A:
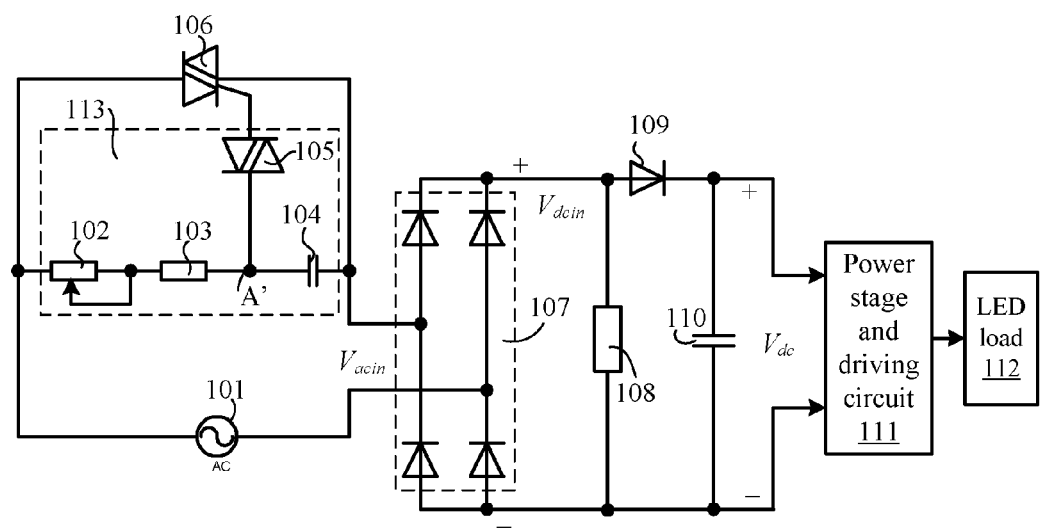
FIG. 1A is a schematic diagram of an example SCR dimming circuit.

Reference will now be made in detail to particular embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set fourth in order to provide a thorough understanding of the present invention. However, it will be readily apparent to one skilled in the art that the present invention may be practiced without these specific details. In other instances, well-known methods, procedures, processes, components, structures, and circuits have not been described in detail so as not to unnecessarily obscure aspects of the present invention.

Some portions of the detailed descriptions which follow are presented in terms of processes, procedures, logic blocks, functional blocks, processing, schematic symbols, and/or other symbolic representations of operations on data streams, signals, or waveforms within a computer, processor, controller, device and/or memory. These descriptions and representations are generally used by those skilled in the data processing arts to effectively convey the substance of their work to others skilled in the art. Usually, though not necessarily, quantities being manipulated take the form of electrical, magnetic, optical, or quantum signals capable of being stored, transferred, combined, compared, and otherwise manipulated in a computer or data processing system. It has proven convenient at times, principally for reasons of common usage, to refer to these signals as bits, waves, waveforms, streams, values, elements, symbols, characters, terms, numbers, or the like.

Furthermore, in the context of this application, the terms "wire," "wiring," "line," "signal," "conductor," and "bus" refer to any known structure, construction, arrangement, technique, method and/or process for physically transferring a signal from one point in a circuit to another. Also, unless indicated otherwise from the context of its use herein, the terms "known," "fixed," "given," "certain" and "predetermined" generally refer to a value, quantity, parameter, constraint, condition, state, process, procedure, method, practice, or combination thereof that is, in theory, variable, but is typically set in advance and not varied thereafter when in use.

Embodiments of the present invention can advantageously provide several advantages over conventional approaches. Particular embodiments may provide an improved SCR dimming circuit and method that results in increased efficiency and improved dimming performance without flicker. For example, due to use of a filter capacitor, current may only be generated from a start-up phase angle to about a 90° phase angle, as may be determined by a filter capacitor and a value of an AC voltage supply. Therefore, a holding resistor can be avoided when the dimming operation is employed within the phase angle range. The invention, in its various aspects, will be explained in greater detail below with regard to exemplary embodiments.

With reference to FIG. 1A, a schematic diagram of an example silicon-controlled rectifier (SCR) dimming circuit is shown. This particular SCR dimming circuit can include AC input supply 101, SCR element 106, trigger 113, rectifier bridge 107, holding resistor 108, and a filter including diode 109 and filter capacitor 110. Trigger 113 can include bi-directional trigger diode (triode for alternating current [TRIAC]) 105 and 106, adjustable resistor 102, resistor 103, and capacitor 104. The anode of SCR element 106 can connect to one terminal of AC power supply 101, while the cathode can connect to rectifier bridge 107. Node A' formed by resistor 103 and capacitor 104 coupled in series can connect to controlling terminal of SCR element 106 through SCR element 105.

Figure 1B:
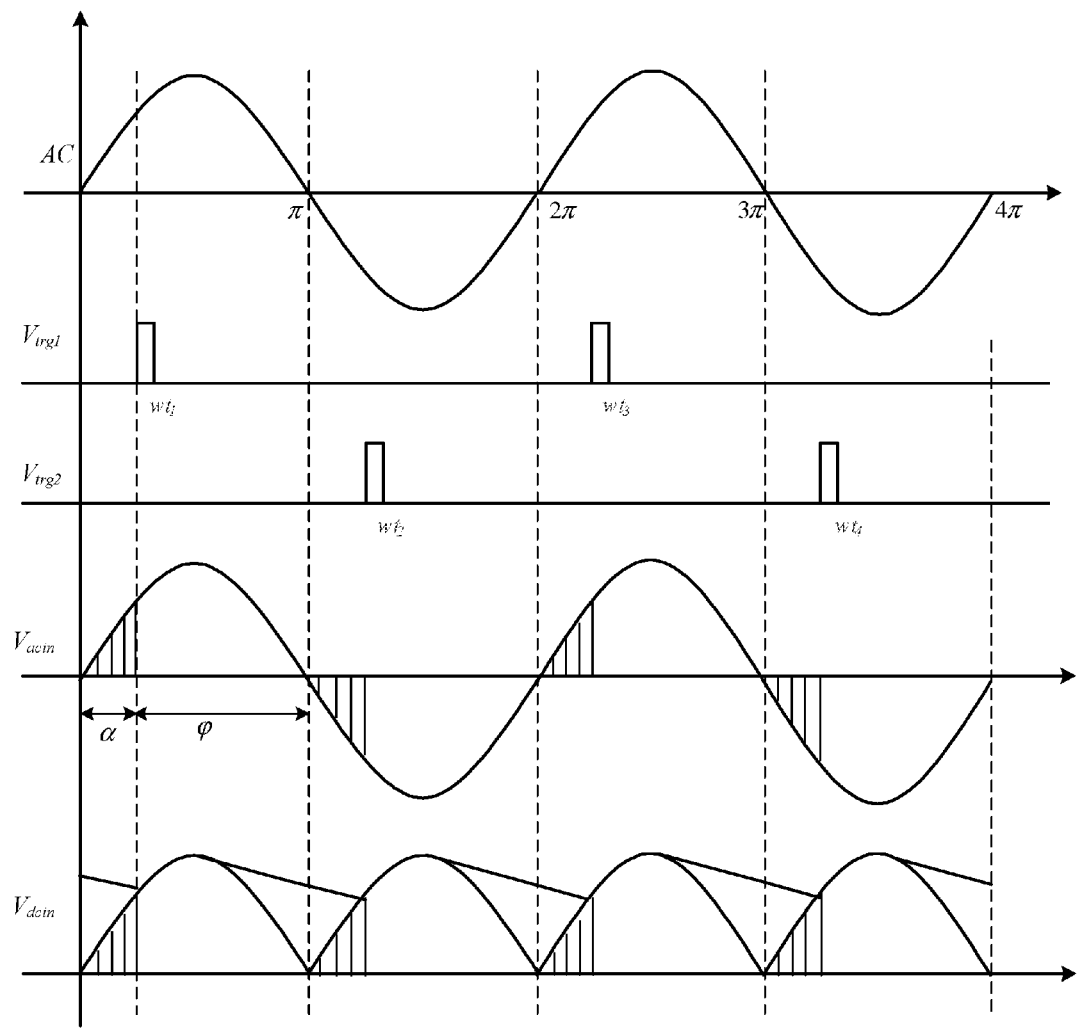
FIG. 1B is a waveform diagram showing example operation of the SCR dimming circuit of FIG. 1A.

In operation, a voltage of a controlling terminal of SCR element 106 may be controlled by adjusting a resistance of adjustable resistor 102. When the voltage of the controlling terminal is higher than a threshold, SCR element 106 can begin to conduct. The phase angle of AC input supply 101 at which SCR element 106 begins to conduct may be controlled. With reference to example waveforms of FIG. 1B employing a leading edge trigger scheme, at time $t_1$ (phase angle $w_{t1}$) after the voltage of sine AC input supply 101 crosses zero, a positive trigger pulse $V_{trg1}$ may be supplied to a controlling terminal of SCR element 106 to trigger SCR element 106 to conduct. In accordance with characteristics of SCR elements, the conduction status may last until the end of positive half sine wave.

SCR element 106 may be off within the control angle $\alpha$ (e.g., phase angle $0$~$w_{t1}$) during a positive half sine wave (e.g., $0$~$\pi$). SCR element 106 may be on within the conduction angle $\phi$ (e.g., interval $w_{t1}$~$\pi$, as shown by vertical lines). While in the negative half sine wave, trigger pulse $V_{trg2}$ may be supplied at time $t_2$ (e.g., phase angle $w_{t2}$) to make SCR element 106 conduct. Thus, conduction phase angle $\phi$ (e.g., controlling phase angle $\alpha$) can be controlled by alteration of a triggering time (or phase angle) of the trigger pulse to obtain a lack-phase AC voltage $V_{acin}$. A DC voltage $V_{dcin}$ can be achieved by rectifying the lack-phase AC voltage through rectifier bridge 107. Also, the larger conduction phase angle $\phi$ is, the higher output voltage $V_{dc}$ may be, thus bringing a higher luminance for light-emitting diode (LED) load 112 through power stage and driving circuit 111.

However, this example AC/DC converting LED driver may be shut down due to the SCR element possibly being closed when the sine AC input voltage crosses the zero point, which can lead to failure in driving LED load 112. When the example SCR dimming circuit is in a condition with relatively low conduction phase angle, the short conduction time of LED load 112 at the twice frequency may be observable by human eyes, possibly resulting in flicker of the LED.

Holding current may be utilized to meet a minimum requirement to maintain a continuous conduction status of the SCR element (TRIAC). For most AC/DC converting LED driver employing a rectifier bridge, a filter circuit may be used to filter the DC voltage with higher fluctuation, such as a filter capacitor 110 with higher capacitance. Therefore, current may only exist during a short interval during the voltage of AC input supply reaching a peak value, and may disappear at remaining intervals. During these intervals, there may not be enough current to maintain the SCR element (TRIAC) to continuously conduct.

In many cases, when the external voltage supply is relatively low, a holding resistor 108 may be added to generate a current in order to maintain SCR element conduct. However, this may lead to extra power loss, lower operation efficiency, and poorer dimming performance.

In one embodiment, an SCR dimming circuit can include: (i) an SCR rectifying circuit having an SCR element configured to receive an AC power supply, and to generate a lack-phase AC voltage; (ii) a rectifier bridge coupled to the SCR rectifying circuit, where the rectifier bridge is configured to convert the lack-phase AC voltage to a lack-phase DC voltage, where the lack-phase DC voltage is configured to be filtered through a filter capacitor to generate a smooth DC voltage; (iii) a conduction phase angle signal generator coupled to the rectifier bridge, where the conduction phase angle signal generator is configured to receive the lack-phase DC voltage, and to generate a controlling signal that indicates a conduction phase angle range of the SCR element; and (iv) a dimming signal generator coupled to the conduction phase angle signal generator and being configured to compare the controlling signal and a slope reference signal to output a dimming signal, the dimming signal generator having a dimming phase angle range from a predetermined start-up phase angle to a cut-off phase angle, where the cut-off phase angle is determined by the filter capacitor and the AC power supply. The slope reference signal is configured to indicate an average value at each phase angle of the AC power supply in a half cycle having a first reference corresponding to the start-up phase angle and a second reference corresponding to the cut-off phase angle. When the controlling signal is equal to the first reference, an LED load is configured to be controlled by the dimming signal to operate in a maximum luminance. When the controlling signal is equal to the second reference, the LED load is configured to be controlled by the dimming signal to operate in a minimum luminance. Also, when the controlling signal is between the first reference and the second reference, the LED load is configured to be controlled by the dimming signal to change linearly between the maximum luminance and the minimum luminance.

Figure 2A:
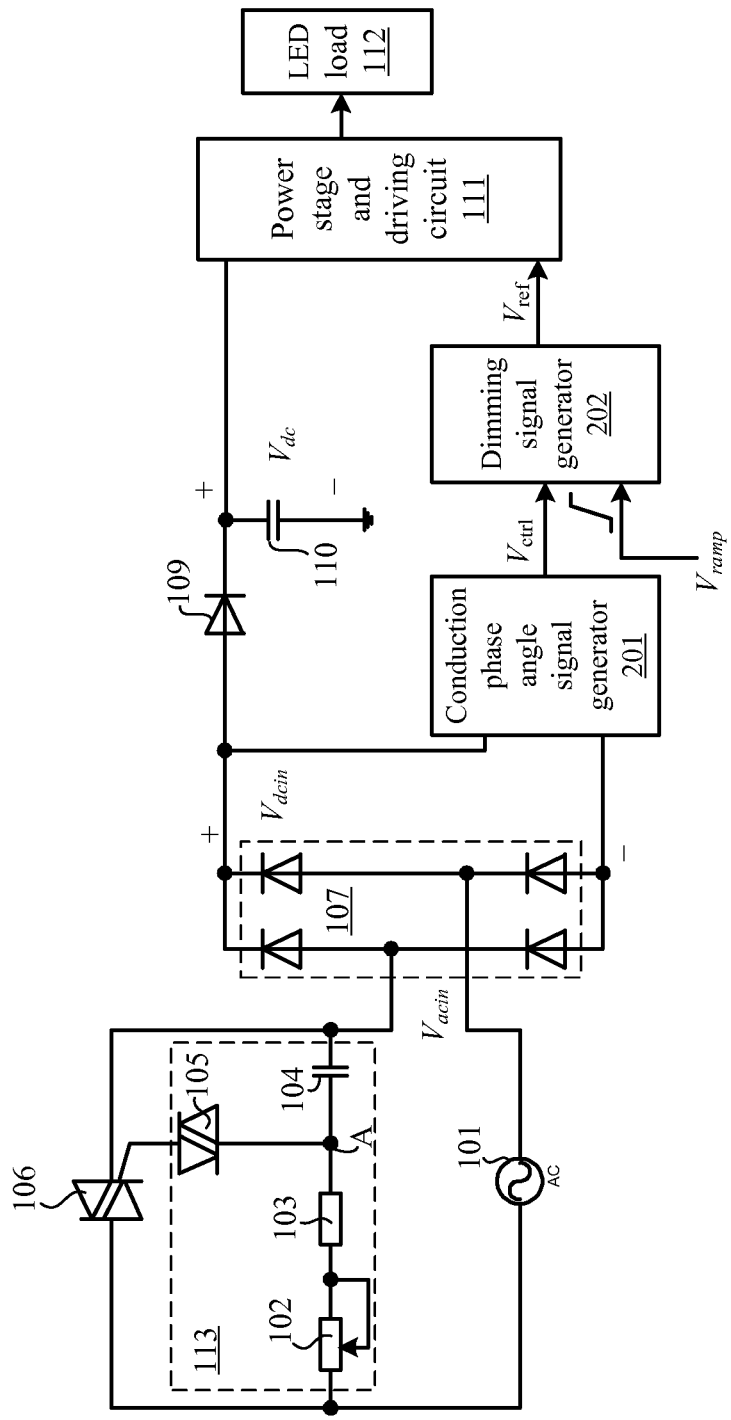
FIG. 2A is a schematic diagram of a first example SCR dimming circuit in accordance with embodiments of the present invention.

Referring now to FIG. 2A, shown is a schematic diagram of a first example SCR dimming circuit in accordance with embodiments of the present invention. Different from the example SCR dimming circuit shown in FIG. 1A, the SCR dimming circuit example of FIG. 2A includes a conduction phase angle signal generator 201 and a dimming signal generator 202.

Conduction phase angle signal generator 201 may be coupled to rectifier bridge 107 to detect the lack-phase DC voltage $V_{dcin}$ generated by rectifier bridge 107, and to generate a controlling signal $V_{ctrl}$ that can indicate a conduction angle range of SCR element 106. Dimming signal generator 202 can compare the controlling signal $V_{ctrl}$ and a slope reference signal $V_{ramp}$ to generate a dimming signal $V_{ref}$ that may indicate the conduction angle range of SCR element 106.

In addition, dimming signal generator 202 can include a dimming phase angle range from a predetermined start-up phase angle to a cut-off phase angle that may be determined by filter capacitor 110 and AC voltage supply 101. The slope reference signal $V_{ramp}$ they indicate an average value of half cycle of the AC voltage supply at each phase angle, having a first reference corresponding to the start-up phase angle, and a second reference corresponding to the cut-off phase angle. For example, the second reference may be lower than the first reference.

In particular embodiments, when the controlling signal $V_{ctrl}$ is equal to the first reference, LED load 112 can be controlled by dimming signal $V_{ref}$ to operate in a maximum luminance. Also, when controlling signal $V_{ctrl}$ is equal to the second reference, LED load 112 can be controlled by dimming signal $V_{ref}$ to operate in a minimum luminance. When the controlling signal $V_{ctrl}$ is between the first reference and second reference, LED load 112 can be controlled by dimming signal $V_{ref}$ to operate linearly between the maximum luminance and minimum luminance linearly. Further, when controlling signal $V_{ctrl}$ is lower than the second reference, LED load 112 can be controlled by dimming signal $V_{ref}$ to operate in a fixed luminance (e.g., about 10%). The start-up phase angle can be a phase angle from 0° to 90°, and the cut-off phase angle can be about 90°.

If the phase angle range that current can flow through filter capacitor 110 is from about 30° to 90° phase angle, the start-up phase angle can be about 30°, and the phase angle range of about 30°-90° can be set as the dimming phase angle range. Within this dimming phase angle range, current can flow through filter capacitor 110 to supply the holding current to maintain conduction of SCR element 106, and luminance of LED load 112 can be regulated continually within this phase angle range.

Figure 2B:
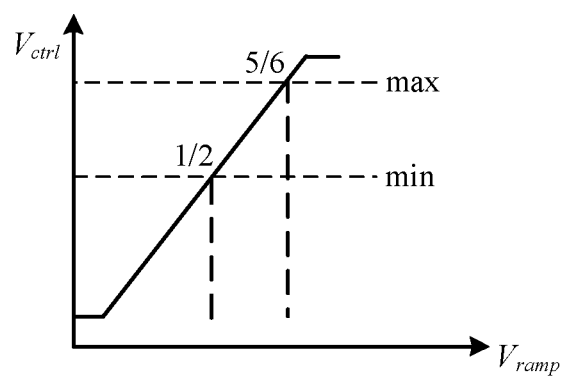
FIG. 2B is a waveform diagram showing example operation of the SCR dimming circuit of FIG. 2A, in accordance with embodiments of the present invention.

With reference to FIG. 2B, an example relationship between slope reference signal and controlling signal is shown. The first reference ($V_{ref1}$) of the slope reference signal may correspond to the average value of AC sine voltage from 30° to 180° phase angle $5V_\pi/6$. The second reference ($V_{ref2}$) may correspond to the average value of AC sine voltage from 90° to 180° phase angle $V_\pi/2$.

When controlling signal $V_{ctrl}$ is equal to the first reference $V_{ref1}$, LED load 112 can be controlled by the dimming signal to operate in a maximum luminance. When the controlling signal $V_{ctrl}$ is equal to the second reference $V_{ref2}$, LED load 112 can be controlled by the dimming signal to operate in a minimum luminance. When the controlling signal $V_{ctrl}$ is between the first reference $V_{ref1}$ and second reference $V_{ref2}$, LED load 112 can be controlled by the dimming signal to operate linearly between the maximum luminance and minimum luminance. When the controlling signal $V_{ctrl}$ is higher than the first reference $V_{ref1}$, LED load 112 can be controlled by the dimming signal to operate in a fixed luminance (e.g., about 10%). When the controlling signal $V_{ctrl}$ is lower than the second reference $V_{ref2}$, LED 112 can be controlled by the dimming signal to be turned off, or to operate in a fixed luminance.

Therefore, by implementation of the example SCR dimming circuit shown in FIG. 2A, a conduction phase angle range may be detected by conduction phase angle signal generator 201, and the dimming operation can be performed within a certain phase angle range by dimming signal generator 202. Dimming phase angle range may be determined by filter capacitor 110 and input AC voltage supply 101 to avoid inclusion of holding resistor 108 with lower resistance. Also, voltage of the dimming phase angle range may be relatively high, which can eliminate flicker of the LED.

Figure 3A:
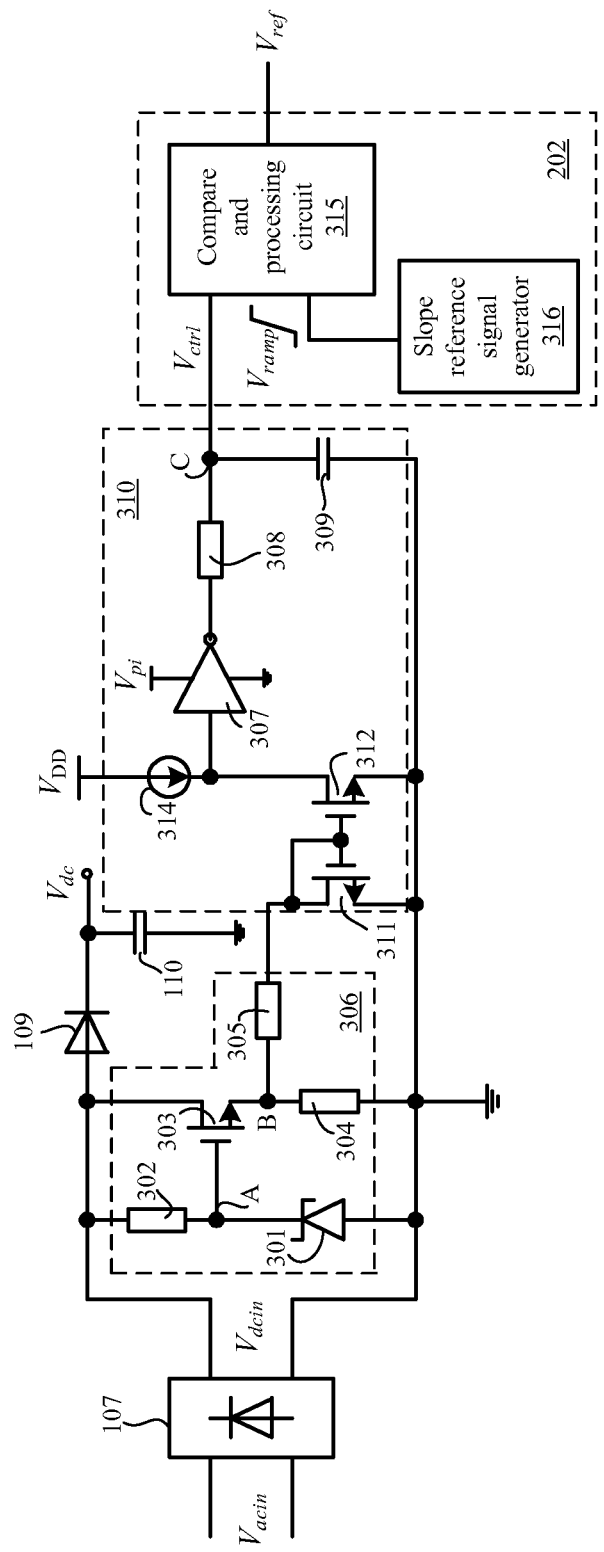
FIG. 3A is a schematic diagram of a second example SCR dimming circuit in accordance with embodiments of the present invention.

With reference to FIG. 3A, a schematic diagram of a second example SCR dimming circuit in accordance with embodiments of the present invention is shown. In this particular example, conduction phase angle signal generator 201 (see, e.g., FIG. 2A) can include phase angle detection circuit 306 and controlling signal generator 310. Also, dimming signal generator 202 can include comparator and processing circuit 315, and slope reference signal generator 316.

Figure 3B:
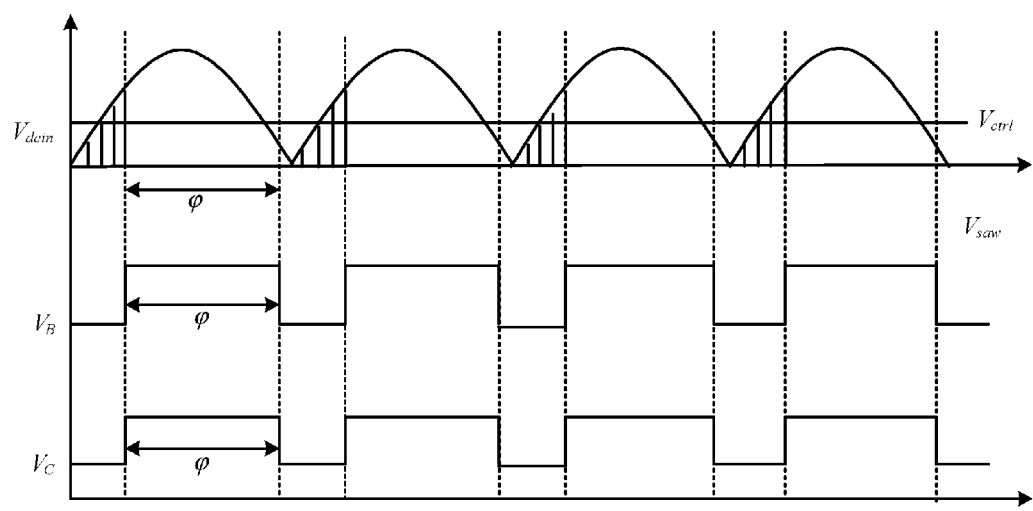
FIG. 3B is a waveform diagram showing example operation of the SCR dimming circuit of FIG. 3A, in accordance embodiments of the present invention.

In the following example, the dimming phase angle range may be selected from a phase angle of about 30° to 90°, and associated example operation waveforms of the phase angle detection circuit of FIG. 3A, are shown in FIG. 3B. Phase angle detection circuit 306 may clamp the lack-phase DC voltage $V_{dcin}$ output by rectifier bridge 107, to generate a square wave signal that indicates a conduction phase angle range of SCR element 106.

In this example, an anode of zener diode 301 of phase angle detection circuit 306 can connect to a second output terminal of rectifier bridge 107, and a cathode of zener diode 301 can connect to a first output terminal of rectifier bridge 107 through resistor 302. Also, a common node of both resistor 302 and zener diode 301 may be indicated as node A. A controlling terminal of transistor 303 can connect to the cathode of the zener diode 301, a first terminal of transistor 303 can connect to a first output terminal of rectifier bridge 107, and a second terminal of transistor 303 can connect to ground through resistor 304 with common node B, as shown.

When the voltage of a first output terminal of rectifier bridge 107 is lower than a breakdown voltage of zener diode 301, transistor 303 may be turned off, and the voltage of node A is about zero. When the voltage of the first output terminal of rectifier bridge 107 is higher than breakdown voltage of zener diode 301, transistor 303 may be turned on, and the voltage of node A can be about equal to a breakdown voltage of zener diode 301. In this way, a square wave signal $V_A$ may be generated that indicates the conduction phase angle range $\phi$ of SCR element 106. A voltage of node B may be slightly lower than a voltage of node A due to the voltage dropdown of transistor 303. A voltage of node B $V_B$ can also be provided to a following circuit through resistor 305.

The square wave signal may be converted to a smooth controlling signal $V_{ctrl}$ by controlling signal generator 310. Controlling signal generator 310 can include inverter 307, resistor 308, and capacitor 309. In this example, one terminal of inverter 307 may receive the square waveform signal, and resistor 308 and capacitor 309 can be connected in series between the other terminal of inverter 307 and the second output terminal of rectifier bridge 107, with the common node C.

A voltage at the common node C between resistor 308 and capacitor 309 may be the controlling signal $V_{ctrl}$ with an example value as shown below in Equation 1.

$$V_{ctrl} = \frac{V_{pi} \cdot \varphi}{\pi} \quad (1)$$

In this equation, $V_{pi}$ may indicate a reference of first inverter 307, and $\phi$ can indicate conduction phase angle range of SCR element 106. Preferably, controlling signal generator 310 further comprises transistor 311, transistor 312 and constant current source 314. When voltage $V_B$ is higher than threshold voltage of transistor 311, transistor 311 is turned on; mirror current is generated on transistor 312 through transistor 311 which is limited by constant current source 314.

Dimming signal generator 202 can include slope reference signal generator 316 and compare and processing circuit 315. Slope reference signal generator 316 may be used to generate a slope reference signal $V_{ramp}$ that indicates an average value of a half cycle of sine AC voltage supply at each phase angle, and having first reference $V_{ref1}$ corresponding to a start-up phase angle, and a second reference $V_{ref2}$ corresponding to a cut-off phase angle.

Slope reference signal generator 316 can be any suitable type of slope signal generator, which can include, e.g., a counter or a charging circuit using a current source to charge a capacitor. Compare and processing circuit 315 can compare the controlling signal $V_{ctrl}$ and slope reference signal $V_{ramp}$ in real-time, and may process the result of the comparison.

When controlling signal $V_{ctrl}$ is equal to the first reference $V_{ref1}$, the LED load can be controlled by the dimming signal to operate in a maximum luminance. When the controlling signal $V_{ctrl}$ is equal to the second reference $V_{ref2}$, the LED load can be controlled by the dimming signal to operate in minimum luminance. When the controlling signal $V_{ctrl}$ is between the first reference $V_{ref1}$ and second reference $V_{ref2}$, the LED load can be controlled by the dimming signal to operate linearly between the maximum luminance and minimum luminance. When the controlling signal $V_{ctrl}$ is higher than the first reference $V_{ref1}$, the LED load can be controlled by the dimming signal to operate in a fixed luminance (such as 10%). When the controlling signal $V_{ctrl}$ is lower than the second reference $V_{ref2}$, the LED load can be controlled by the dimming signal to be turned off, or operate in a fixed luminance.

For the particular example SCR dimming circuit shown in FIG. 3A, the conduction phase angle range of SCR element 106 may be detected through the conduction phase angle signal generator, and the dimming operation may implemented within a dimming phase angle range controlled by dimming signal generator 202.

In one embodiment, an SCR dimming method for regulating luminance of an LED load, can include: (i) converting an external AC power supply to a lack-phase AC voltage; (ii) rectifying the lack-phase AC voltage to generate a lack-phase DC voltage; (iii) converting the lack-phase DC voltage to a controlling signal that indicates a conduction phase angle range of an SCR element; (iv) comparing the controlling signal and a slope reference signal to generate a dimming signal; (v) controlling, by the dimming signal, the LED load to operate in a maximum luminance when the controlling signal is equal to a first reference of the slope reference signal; (vi) controlling, by the dimming signal, the LED load to operate in a minimum luminance when the controlling signal is equal to a second reference of the slope reference signal; and (vii) controlling, by the dimming signal, the LED load to change linearly when the controlling signal is between the first reference and the second reference of the slope reference signal.

Figure 4:
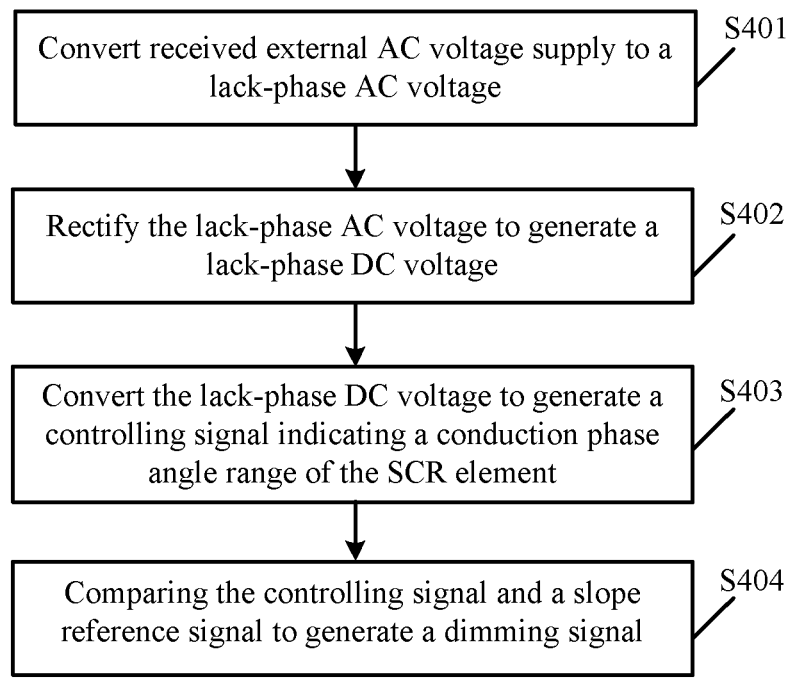
FIG. 4 is a flow diagram of an example SCR dimming method in accordance with embodiments of the present invention.

Referring now to FIG. 4, shown is a flow chart of an example SCR dimming method in accordance embodiments of the present invention. At S401, the received external AC voltage supply may be converted to a lack-phase AC voltage. At S402, the lack-phase AC voltage may be rectified to generate a lack-phase DC voltage. At S403, the lack-phase DC voltage may be converted to generate a controlling signal that indicates a conduction phase angle range of the SCR element. At S404, the controlling signal and a slope reference signal may be compared to generate a dimming signal.

When the controlling signal is equal to a first reference, the LED load may be controlled by the dimming signal to operate in a maximum luminance. When the controlling signal is equal to a second reference, the LED load can be controlled by the dimming signal to operate in minimum luminance. When the controlling signal is between the first reference and second reference, the LED load may be controlled by the dimming signal to operate linearly between the maximum luminance and minimum luminance linearly. When the controlling signal is higher than the first reference, the LED load may be controlled by the dimming signal to operate in a fixed luminance (such as 10%). When the controlling signal is lower than the second reference, the LED load can be controlled by the dimming signal to be turned off, or operate in a fixed luminance.

The example SCR dimming method can also include clamping the lack-phase DC voltage to generate a square wave signal that conduction phase angle range of SCR element, and filtering the square waveform signal based on a reference to generate a smooth voltage indicating conduction phase angle range of SCR element.

In one embodiment, an LED driver can include: (i) the SCR dimming circuit; and (ii) a power stage and a driving circuit, where the power stage and the driving circuit are configured to receive the DC voltage generated by the filter capacitor and the dimming signal to drive and to regulate luminance of the LED load. An LED driver including an SCR dimming circuit, such as shown in FIG. 2A or FIG. 3A, may thus also be accommodated in particular embodiments. As shown in the example of FIG. 2A, power stage and driving circuit 111 can receive DC voltage $V_{dc}$ and dimming signal $V_{ref}$ to drive subsequent LED load 112, and to regulate the luminance of LED load 112.

The foregoing descriptions of specific embodiments of the present invention have been presented through images and text for purpose of illustration and description of the SCR dimming circuit and method. They are not intended to be exhaustive or to limit the invention to the precise forms disclosed, and obviously many modifications and variations are possible in light of the above teaching. For example, any type of transistor can be selected in place of a MOSFET transistor, and the filter circuit and slope signal generator can be any suitable type of structure. Further, while leading edge trigger mode is exemplified in the description herein, those skilled in the art will recognize that trailing edge trigger mode can also be accommodated in particular embodiments.

The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A silicon-controlled rectifier (SCR) dimming circuit, comprising:
    a) an SCR rectifying circuit having an SCR element configured to receive an AC power supply, and to generate a lack-phase AC voltage;
    b) a rectifier bridge coupled to said SCR rectifying circuit, wherein said rectifier bridge is configured to convert said lack-phase AC voltage to a lack-phase DC voltage, wherein said lack-phase DC voltage is configured to be filtered through a filter capacitor to generate a smooth DC voltage;
    c) a conduction phase angle signal generator coupled to said rectifier bridge, wherein said conduction phase angle signal generator is configured to receive said lack-phase DC voltage, and to generate a controlling signal that indicates a conduction phase angle range of said SCR element; and
    d) a dimming signal generator coupled to said conduction phase angle signal generator and being configured to compare said controlling signal and a slope reference signal to output a dimming signal, said dimming signal generator having a dimming phase angle range from a predetermined start-up phase angle to a cut-off phase angle, wherein said cut-off phase angle is determined by said filter capacitor and said AC power supply,
    e) wherein said slope reference signal is configured to indicate an average value at each phase angle of said AC power supply in a half cycle having a first reference corresponding to said start-up phase angle and a second reference corresponding to said cut-off phase angle,
    f) wherein when said controlling signal is equal to said first reference, a light-emitting diode (LED) load is configured to be controlled by said dimming signal to operate in a maximum luminance,
    g) wherein when said controlling signal is equal to said second reference, said LED load is configured to be controlled by said dimming signal to operate in a minimum luminance, and
    h) wherein when said controlling signal is between said first reference and said second reference, said LED load is configured to be controlled by said dimming signal to change linearly between said maximum luminance and said minimum luminance.

2. The SCR dimming circuit of claim 1, wherein said start-up phase angle comprises a phase angle between 0° and 90°, and said cut-off phase angle is about 90°.

3. The SCR dimming circuit of claim 1, wherein said conduction phase angle signal generator comprises:
    a) a phase angle detection circuit coupled to said rectifier bridge, wherein said phase angle detection circuit is configured to receive said lack-phase DC voltage, and to generate a square wave signal; and
    b) a controlling signal generator coupled to said phase angle detection circuit, wherein said controlling signal generator is configured to filter said square wave signal, and to generate a smooth controlling signal that indicates said conduction phase angle range of said SCR element.

4. The SCR dimming circuit of claim 3, wherein said phase angle detection circuit comprises a clamping circuit having a zenera diode and a transistor, wherein:
    a) a breakdown voltage of said zener diode is arranged as a value of said AC power supply corresponding to said start-up phase angle;
    b) an anode of said zener diode is coupled to a second output terminal of said rectifier bridge, and a cathode of said zener diode is coupled through a first resistor to a first output terminal of said rectifier bridge; and
    c) a controlling terminal of said transistor is coupled to said cathode of said zener diode, a first terminal of said transistor is coupled to said first output terminal of said rectifier bridge, and a second terminal of said transistor is coupled to ground through a second resistor, wherein said clamping circuit is configured to generate said square wave signal that indicates said conduction phase angle range of said SCR element.

5. The SCR dimming circuit of claim 3, wherein said controlling signal generator comprises a first inverter and a first filter circuit having a resistor and a capacitor, wherein:
    a) a first terminal of said inverter is configured to receive said square wave signal;
    b) said resistor and said capacitor are coupled in series between a second terminal of said inverter and a terminal of said rectifier bridge; and
    c) a voltage at a common node of said resistor and said capacitor is configured to be used as said controlling signal.

6. The SCR dimming circuit of claim 1, wherein said dimming signal generator comprises:
    a) a slope reference signal generator configured to generate said slope reference signal; and
    b) a compare and processing circuit configured to compare said controlling signal through a first input terminal and said slope reference signal through a second input terminal, and to generate said dimming signal.

7. A silicon-controlled rectifier (SCR) dimming method for regulating luminance of a light-emitting diode (LED) load, the method comprising:
    a) converting an external AC power supply to a lack-phase AC voltage;
    b) rectifying said lack-phase AC voltage to generate a lack-phase DC voltage;
    c) converting said lack-phase DC voltage to a controlling signal that indicates a conduction phase angle range of an SCR element;
    d) comparing said controlling signal and a slope reference signal to generate a dimming signal;

e) controlling, by said dimming signal, said LED load to operate in a maximum luminance when said controlling signal is equal to a first reference of said slope reference signal;
f) controlling, by said dimming signal, said LED load to operate in a minimum luminance when said controlling signal is equal to a second reference of said slope reference signal; and
g) controlling, by said dimming signal, said LED load to change linearly when said controlling signal is between said first reference and said second reference of said slope reference signal.

8. The method of claim 7, further comprising controlling, by said dimming signal, said LED load to operate in a fixed luminance when said controlling signal is less than said second reference of said slope reference signal.

9. The method of claim 7, further comprising:
a) clamping said lack-phase DC voltage to generate a square wave signal that indicates said conduction phase angle range of said SCR element; and
b) filtering said square wave signal based on a predetermined reference to generate a smooth voltage signal that indicates said conduction phase angle range of said SCR element.

10. An LED driver, comprising:
a) said SCR dimming circuit of claim 1; and
b) a power stage and a driving circuit, wherein said power stage and said driving circuit are configured to receive said DC voltage generated by said filter capacitor and said dimming signal to drive and to regulate luminance of said LED load.

* * * * *